MODULAR FURNITURE AND COMPONENTS THEREOF

Filed Feb. 25, 1963

8 Sheets-Sheet 1

INVENTOR.
CHARLES U. DEATON
BY Alfred W. Petchaft
ATTORNEY

March 22, 1966 C. U. DEATON 3,241,885

MODULAR FURNITURE AND COMPONENTS THEREOF

Filed Feb. 25, 1963 8 Sheets-Sheet 2

INVENTOR.
CHARLES U. DEATON

BY Alfred W. Petchaft

ATTORNEY

INVENTOR.
CHARLES U. DEATON

BY

ATTORNEY

INVENTOR.
CHARLES U. DEATON
BY
Alfred W. Petchaft
ATTORNEY

March 22, 1966 C. U. DEATON 3,241,885

MODULAR FURNITURE AND COMPONENTS THEREOF

Filed Feb. 25, 1963 8 Sheets-Sheet 5

INVENTOR.
CHARLES U. DEATON

BY

ATTORNEY

MODULAR FURNITURE AND COMPONENTS THEREOF

Filed Feb. 25, 1963 8 Sheets-Sheet 6

INVENTOR.
CHARLES U. DEATON
BY
Alfred W Petchaft
ATTORNEY

March 22, 1966 C. U. DEATON 3,241,885

MODULAR FURNITURE AND COMPONENTS THEREOF

Filed Feb. 25, 1963 8 Sheets-Sheet 7

INVENTOR.
CHARLES U. DEATON

BY [signature]

ATTORNEY

March 22, 1966 C. U. DEATON 3,241,885

MODULAR FURNITURE AND COMPONENTS THEREOF

Filed Feb. 25, 1963 8 Sheets-Sheet 8

INVENTOR.
CHARLES U. DEATON

BY Alfred W. Petchaft

ATTORNEY

United States Patent Office 3,241,885
Patented Mar. 22, 1966

3,241,885
MODULAR FURNITURE AND COMPONENTS THEREOF

Charles U. Deaton, Lakewood, Colo.
Filed Feb. 25, 1963, Ser. No. 260,727
10 Claims. (Cl. 297—440)

This invention relates in general to certain new and useful improvements in furniture, and more particularly, to modular furniture and the various components forming a part thereof.

Furniture consisting of modular components has become increasingly popular since the various components may be shipped in separate containers or in a dissassembled form reducing shipping costs. Moreover, such furniture can be easily assembled by the retailer or interior decorator at point of display or use in a wide variety of different combinations to meet different requirements.

However, the modular furniture heretofore produced has lacked the fine appearance and finish of high quality furniture, and, for the most part, are clearly recognizable as modular components even when assembled. Moreover, the modules are not so interrelated in size and shape as to be adaptable to many different lay-outs and cannot be readily used to create a so-called custom-built appearance, that is to say, an appearance of having been built to fit a particular wall-space or floor arrangement.

A further disadvantage of modular furniture components heretofore produced resides in the fact that each module serves one particular function. The modules are not flexibly interchangeable, and cannot be readily interconnected to form a single or unitized assembly consisting of many modules. In prior designs the various modules retain their separate identity and cannot readily be merged into a unitary structure having homogeneous appearance.

It is, therefore, the primary object of the present invention to provide a modular furniture in which the components thereof are readily interchangeable, interrelated and interconnectable.

It is another object of the present invention to provide modular furniture of the type stated in which a minimum number of basic components are capable of being assembled in an almost infinite variety of different configurations.

It is a further object of the present invention to provide modular furniture of the type stated which, when assembled, will have the appearance and finish of high-quality expensive furniture but, nevertheless, will be relatively economical in cost.

It is an additional object of the present invention to provide modular furniture of the type stated having components which are capable of being easily and rapidly assembled.

It is also an object of the present invention to provide modular furniture of the type stated which can be assembled without skilled labor or specialized tools.

With the above and other objects in view, my invention resides in the novel features of form, construction, arrangement, and combination of parts presently described and pointed out in the claims.

In the accompanying drawings (eight sheets)—

Figure 4:
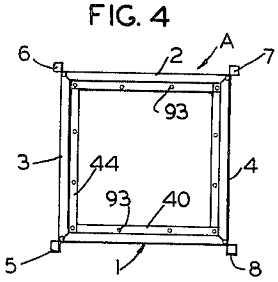
Figure 5:
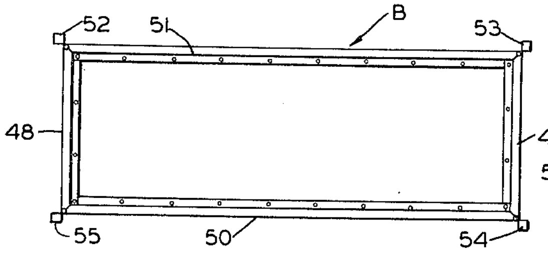
Figure 6:
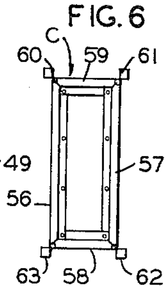
Figures 1, 2, 3, 7, 8, 9, 10, 11, 12, 13, 14, 15, 16:
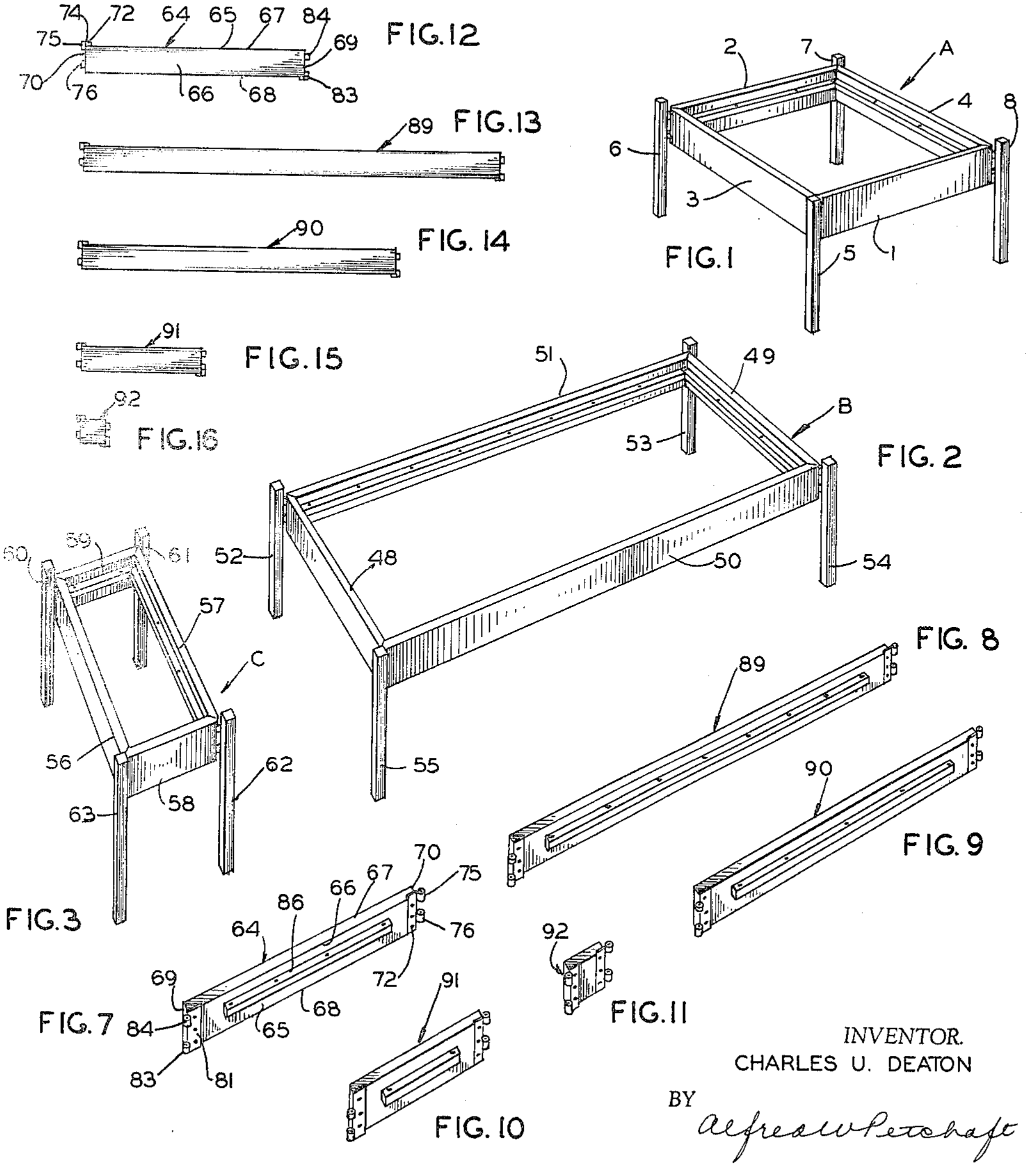
FIG. 1 is a perspective view of a single or unit-sized base-frame constructed in accordance with and forming part of the present invention.
FIG. 2 is a perspective view of a double base-frame forming part of the present invention.
FIG. 3 is a perspective view of a half-base frame forming part of the present invention.
Figures 17, 18, 26, 46:
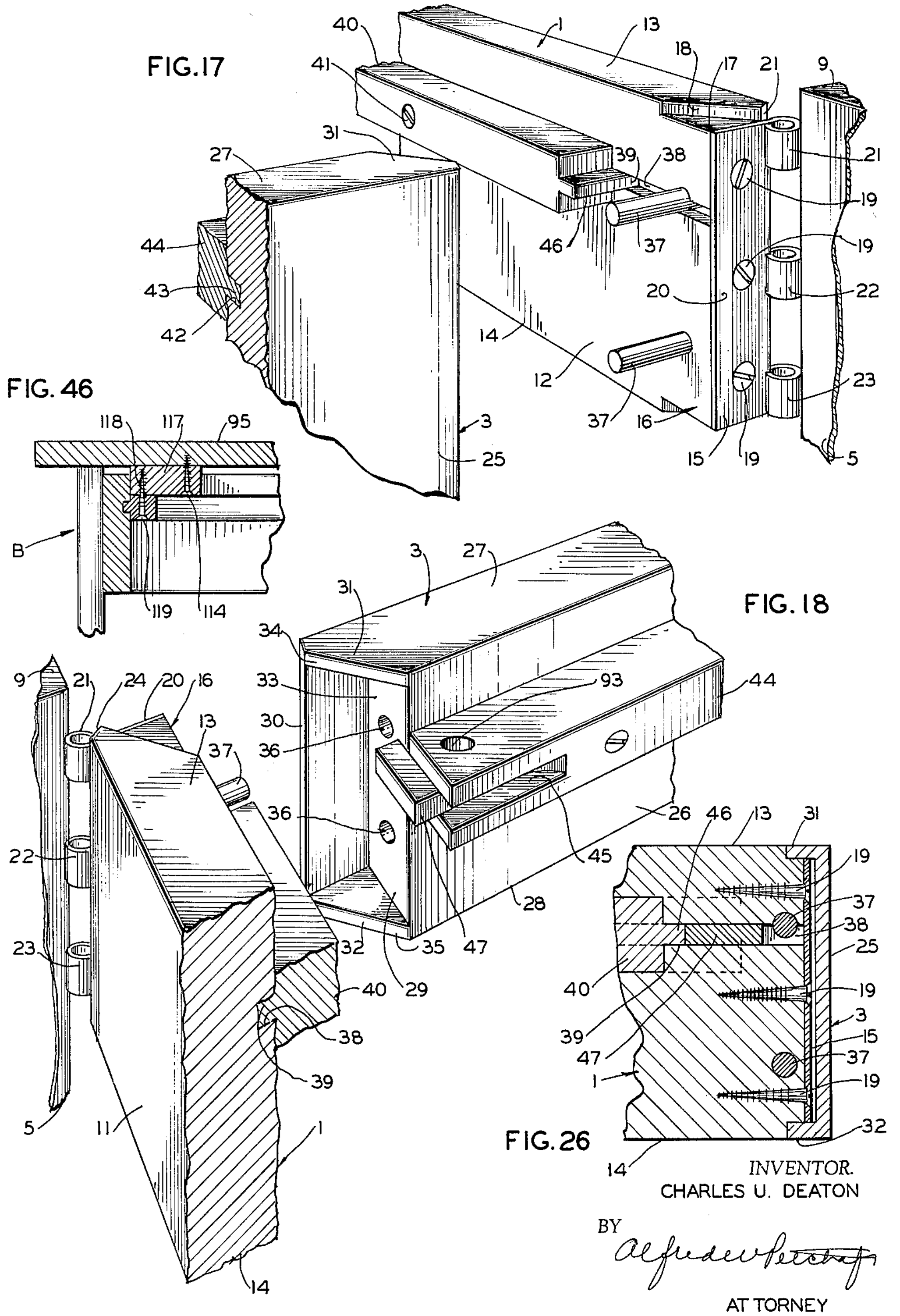
Figures 19, 20, 21, 22:
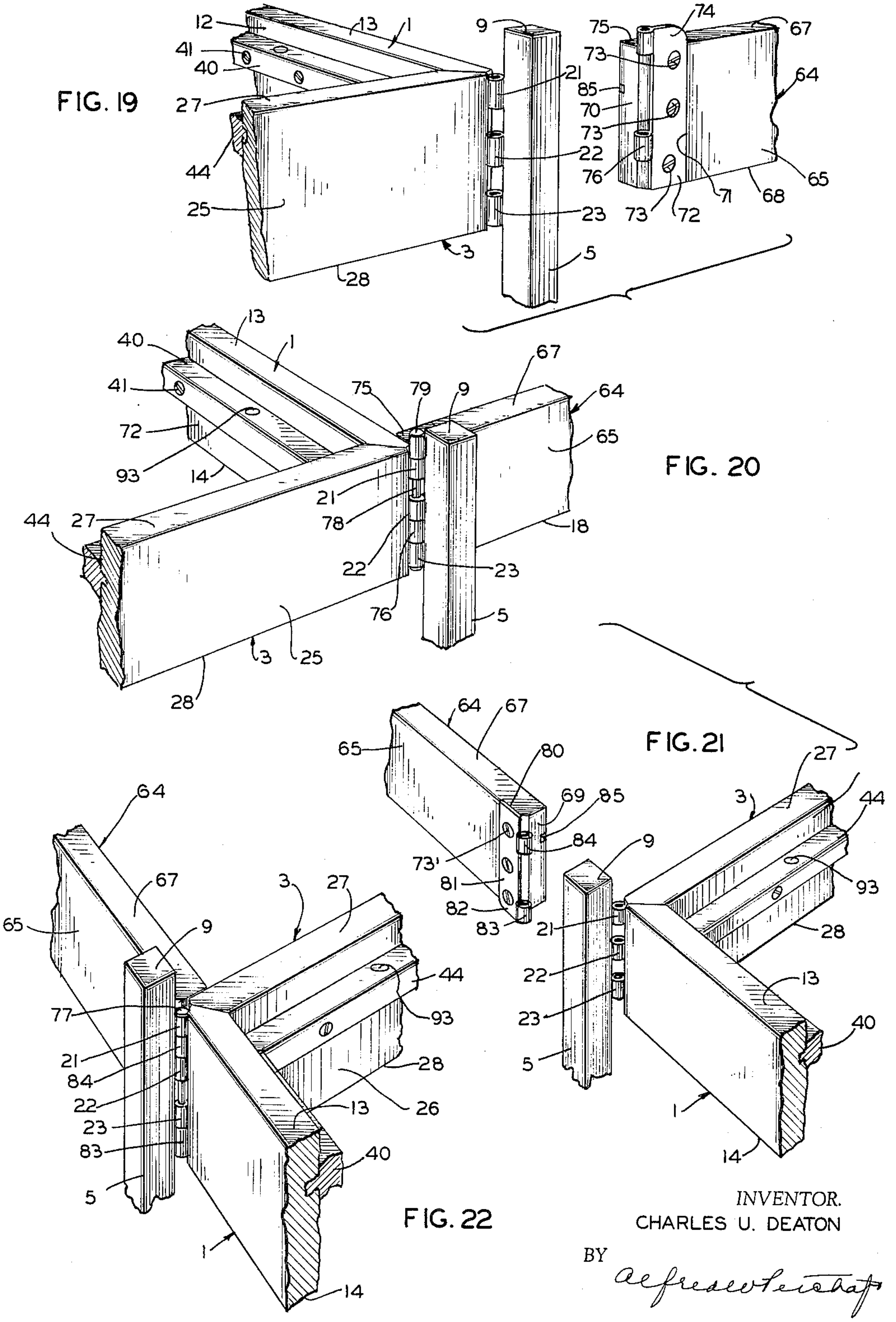
Figures 23, 24, 25:
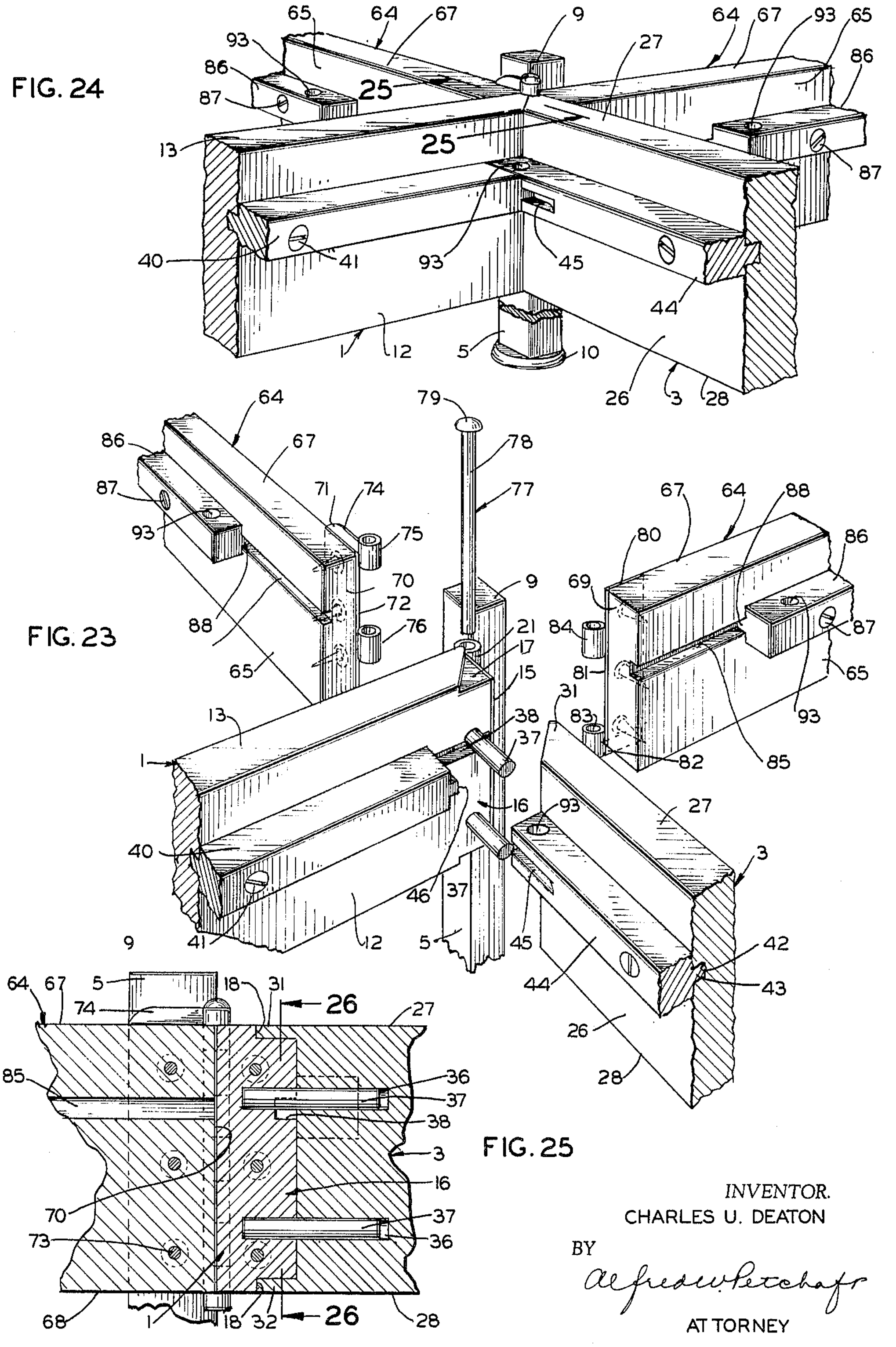
Figure 30:
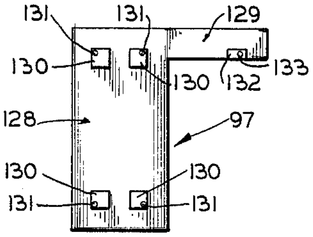
Figure 32:
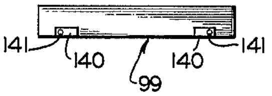
Figure 31:
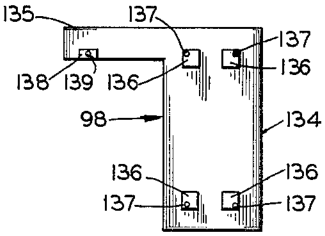
Figure 27:
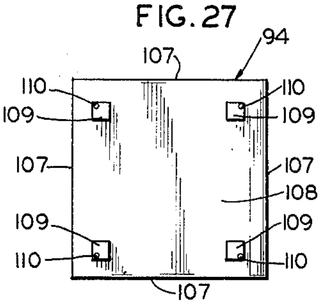
Figures 28, 29:
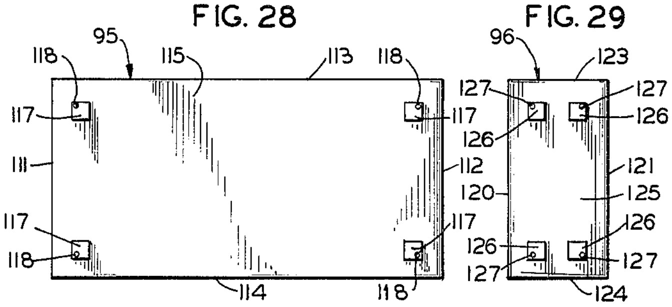
Figure 33:
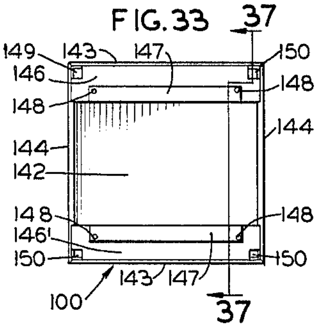
Figures 34, 35:
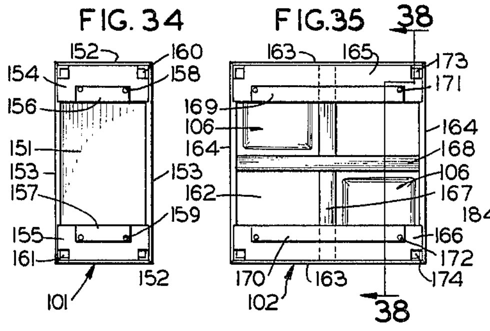
Figure 36:
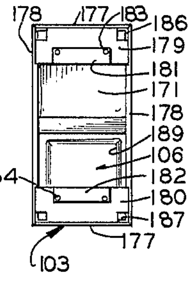
Figures 37, 38:
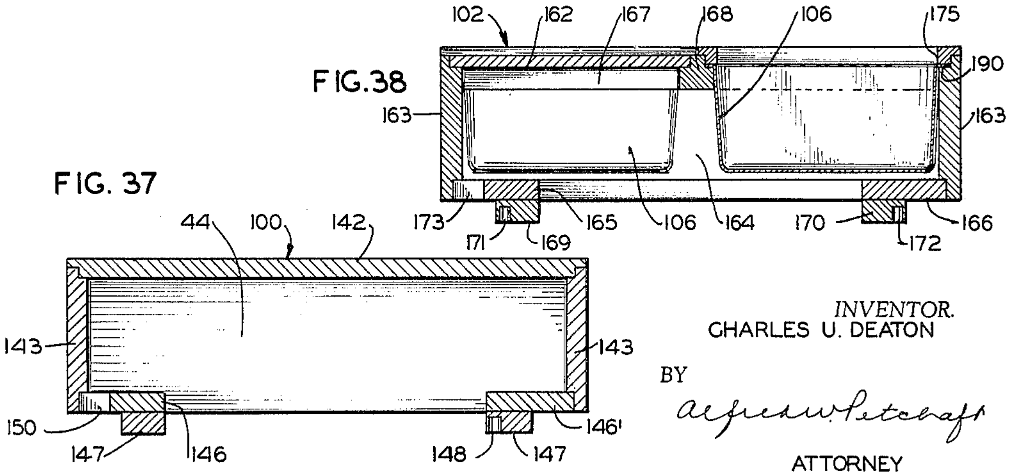
Figures 39, 40, 41, 43, 44, 45:
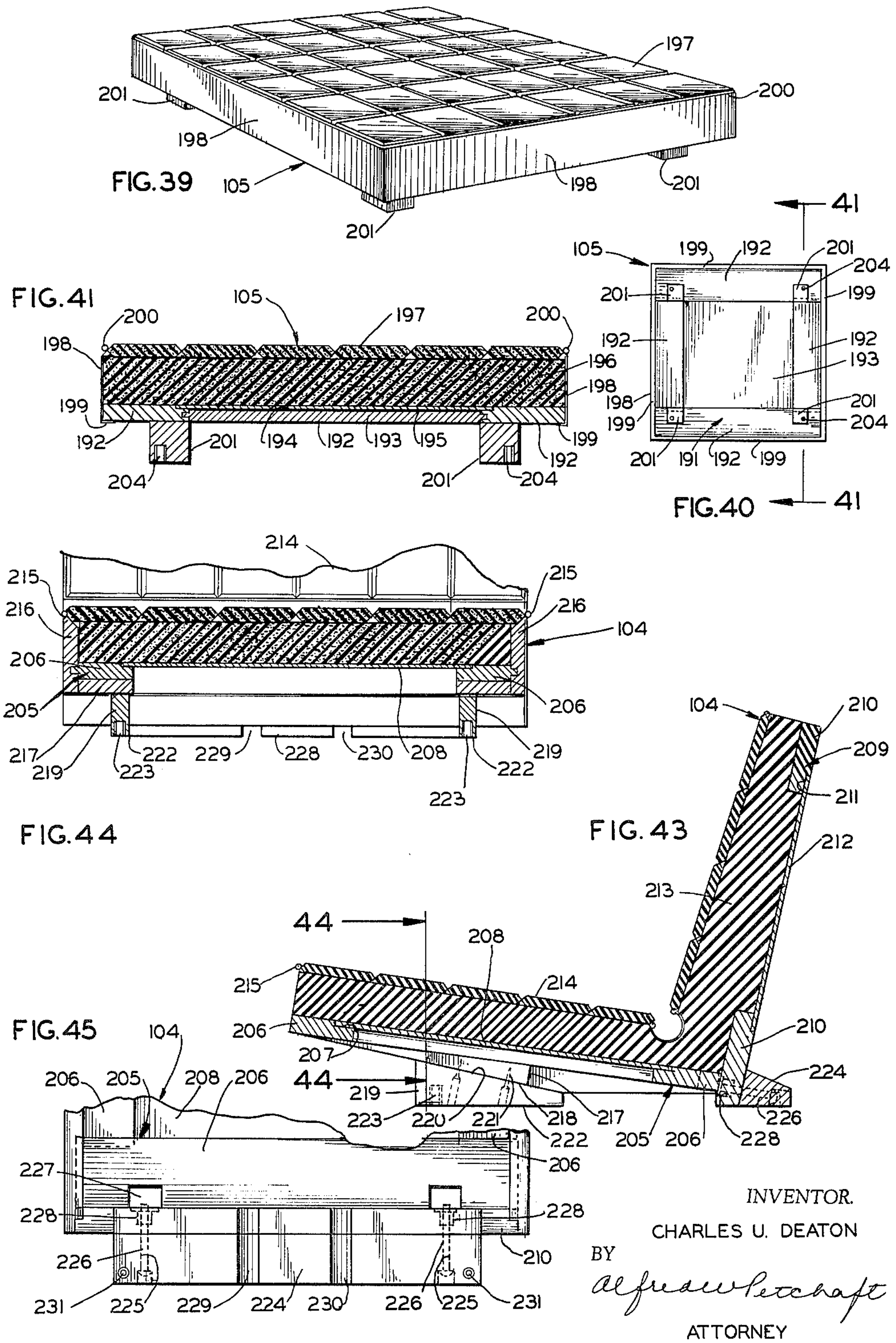
Figure 47:
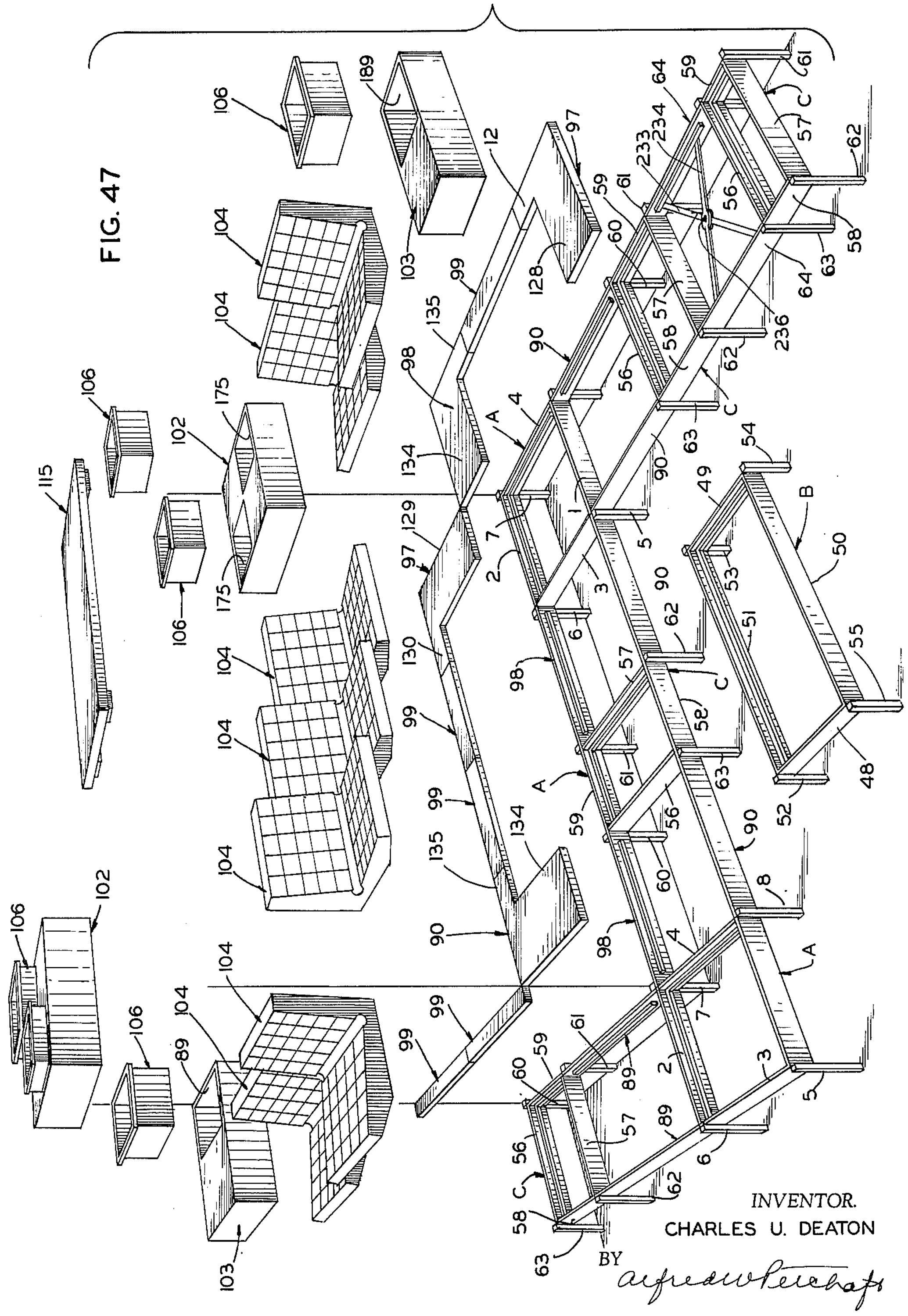
Figures 42, 48, 49:
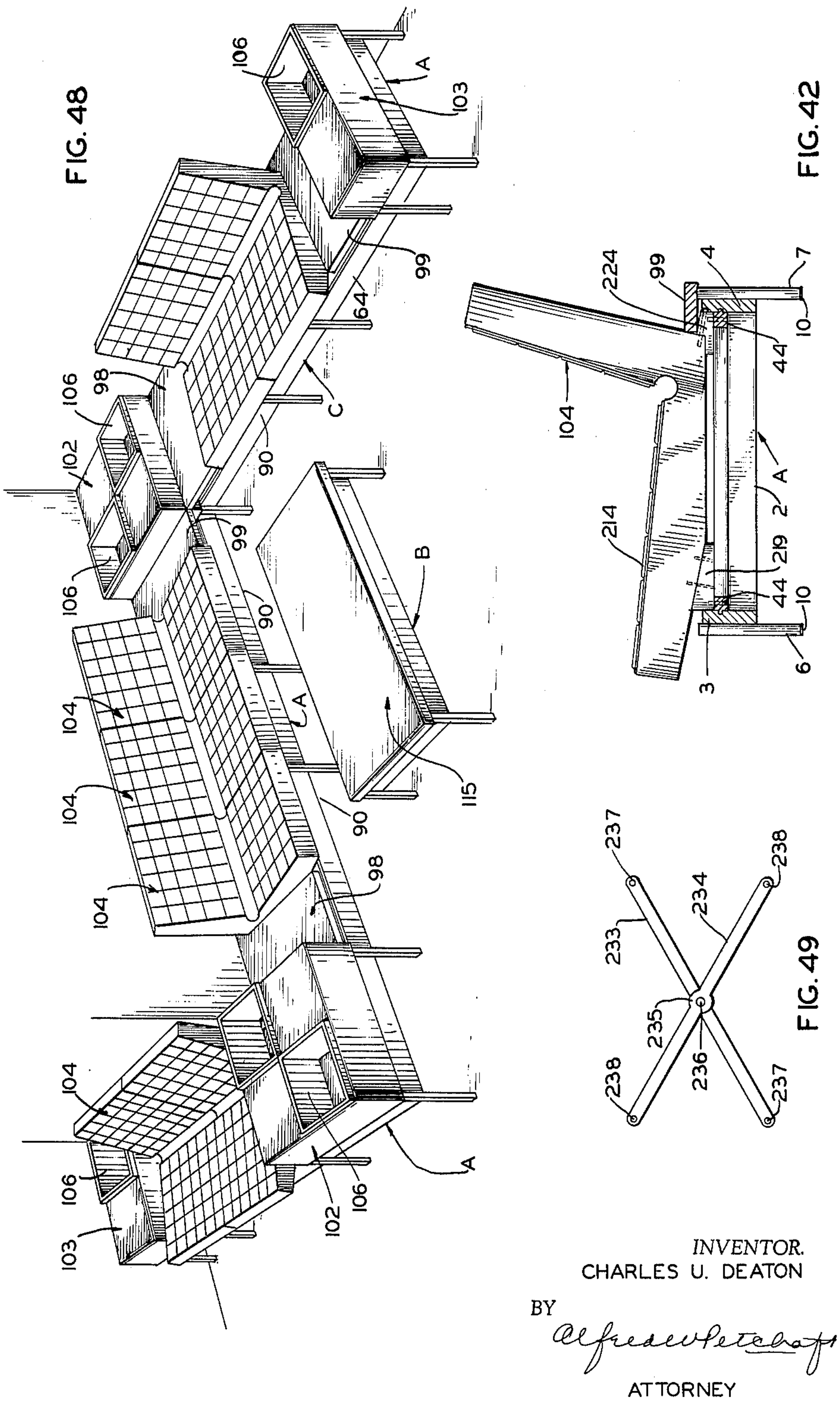

FIGS. 4, 5, and 6, are top plan views of the base-frames of FIG. 1, 2, and 3, respectively;

FIGS. 7, 8, 9, and 10, are perspective views of base-frame connector-rails forming part of the present invention;

FIG. 11 is a perspective view of a spacer block forming part of the present invention;

FIGS. 12, 13, 14, and 15, are front elevational views of the base-frame connector-rails of FIGS. 7, 8, 9, and 10, respectively;

FIG. 16 is a front elevational view of the spacer block of FIG. 11;

FIG. 17 is a fragmentary exploded perspective view of a corner connection of two rails in the base-frame of FIG. 1;

FIG. 18 is a fragmentary exploded perspective view of another corner connection of the base-frame of FIG. 1;

FIG. 19 is a fragmentary exploded perspective view showing the corner connection of a base-frame and connector-rail;

FIG. 20 is a fragmentary perspective view of the base-frame corner and connector-rail of FIG. 19 in the connected position;

FIG. 21 is a fragmentary exploded perspective view showing the corner connection of a base-frame and the opposite end of a connector-rail;

FIG. 22 is a fragmentary perspective view of the base-frame and connector-rail of FIG. 21 in the attached position;

FIG. 23 is a fragmentary exploded perspective view of a corner connection of a base-frame and two connector-rails;

FIG. 24 is a fragmentary perspective view of the base-frame and connector-rails of FIG. 23 in the attached position;

FIG. 25 is a vertical sectional view taken along line 25—25 of FIG. 24;

FIG. 26 is a vertical sectional view taken along line 26—26 of FIG. 25;

FIG. 27 is a bottom plan view of a single furniture top forming part of the present invention;

FIG. 28 is a bottom plan view of a double furniture top forming part of the present invention;

FIG. 29 is a bottom plan view of a half furniture top forming part of the present invention;

FIG. 30 is a bottom plan view of a left L-shaped furniture top;

FIG. 31 is a bottom plan view of a right L-shaped furniture top;

FIG. 32 is a bottom plan view of a filler top;

FIG. 33 is a bottom plan view of a table top forming part of the present invention;

FIG. 34 is a bottom plan view of a half-table top forming part of the present invention;

FIG. 35 is a bottom plan view of a planter box forming part of the present invention;

FIG. 36 is a bottom plan view of a half planter box forming part of the present invention;

FIG. 37 is a sectional view taken along line 37—37 of FIG. 33;

FIG. 38 is a sectional view taken along line 38—38 of FIG. 35;

FIG. 39 is a perspective view of a seat cushion forming part of the modular furniture set;

FIG. 40 is a bottom plan view of the seat cushion of FIG. 39;

FIG. 41 is a sectional view taken along line 41—41 of FIG. 40;

FIG. 42 is an end elevational view of a chair attached to a base-frame, the latter partially being in section;

FIG. 43 is a vertical sectional view taken through the chair of FIG. 42 when viewed in the same direction;

FIG. 44 is a fragmentary sectional view taken along line 44—44 of FIG. 43;

FIG. 45 is a fragmentary bottom plan view of the chair of FIG. 42;

FIG. 46 is a fragmentary sectional view showing the method of attaching a furniture top to a base-frame;

FIG. 47 is an exploded perspective view of the modular furniture components constructed in accordance with and embodying the present invention in one configuration or so-called "lay-out";

FIG. 48 is a perspective view of the modular furniture components of FIG. 47 in the assembled configuration; and FIG. 49 a top plan view of a pair of reinforcing struts used in accordance with the present invention.

Generally speaking, the present invention resides in a novel concept of modular furniture, and the several units which may be variously combined to achieve many different arrangements and decorator-effects. To accomplish such results in accordance with the present invention, it is possible to employ three furniture base-frames, one of which is a unit-sized element and the other two of which are modular multiples or sub-multiples of the first. Also included with the present invention is a plurality of each of five connecting members which are designed to be interposed between any two of the aforementioned base-frames and thereby connecting any of the base-frames in a wide variety of different arrangements. Again, one of such connecting members is unit-sized, and the other four are modular multiples thereof.

Except for length, the three base-frames are of substantially identical construction and are provided with matching fasteners at their terminal margins. Thus, the fastener on one terminal margin of one frame is adapted for attachment to the complementary fastener or terminal margin of another frame or, for that matter, any other component of the furniture group. Moreover, the connecting members are provided with terminal fasteners which are sized for attachment to one of the terminal fasteners on the frame supports. Thus, the various base-frames with the connecting members can be used to form a base configuration or lay-out, which will fit a particular floor plan.

Provided for interchangeable attachment to the aforementioned base frames is a number of furniture-forming elements, such as table-forming elements, seat-forming elements, and the like, all of which are interchangeable and conform dimensionally to the modular system of the base-frames.

Referring now in more detail and by reference characters to the drawings, which illustrate a preferred embodiment of the present invention, A designates a single or unit-sized base-frame which generally consists of a pair of longitudinal rails 1, 2, and a pair of transverse rails 3, 4. Each of the rails 1, 2, 3, 4, is formed preferably of high-quality wood and suitably finished on its exterior face and are joined together at their respective ends to form a rectilinear frame which is provided at its four corners with tubular legs 5, 6, 7, 8, fabricated preferably of stainless steel or other suitable material. Each of the legs 5, 6, 7, 8, is provided at its closed upper end with a closure plug 9 and at its lower end with a glide 10.

The corner connection between the rail 1 and the rail 3 is more fully illustrated in FIG. 17 and FIG. 18. The rail 1 is rectangular in vertical cross-section and includes an exterior face 11, an interior face 12, a top face 13, a bottom face 14, and transverse end faces 15. The top and bottom faces are beveled adjacent the transverse end faces 15 to form a projecting plug-like segment 16 having upper and lower triangularly shaped flat surfaces 17 and shoulders 18 which are oblique with respect to the transverse end face 15. Secured to the transverse end face 15 by means of wood screws 19 is a metal joint-plate 20 which somewhat resembles one element of a common butt-hinge and is integrally provided along its exterior margin with three vertically spaced pintle-receiving sleeves or knuckles 21, 22, 23. By reference to FIG. 21, it can be seen that the pintle receiving sleeve 21 is formed with the plate 20 so that its upper margin is continuous with the upper margin of the plate 20, and the sleeve 23 is formed so that its lower margin is continuous with the lower margin of the plate 20. Moreover, the sleeve 22 is located at a point which is equidistant between the upper and lower sleeves 21, 23, respectively. The sleeves 21, 22, 23, are vertically aligned and extend outwardly from the plate 20 at approximately a 45° angle with respect to the exterior face 11. The common margin of the exterior face 11 and transverse end face 15 is provided with a beveled surface 24 which serves as a relief for the three vertically aligned sleeves 21, 22, 23. Welded or otherwise rigidly secured to the outer margins of each of the sleeves 21, 22, 23, is the tubular leg 5.

The rail 3 includes an exterior face 25, an interior face 26, a top face 27, a bottom face 28, and transverse end faces 29. The exterior face 25 and the top and bottom faces 27, 28, are provided with extended margins 30, 31, 32, which form a socket 33 for snugly accommodating the plug-like segment 16. The overhanging margins 31, 32, form oblique shoulders 34, 35, which abut the oblique shoulders 18 and the flat surfaces 17 engage the interior faces of the margins 31, 32. Moreover, the transverse end face 29 is provided with a pair of vertically spaced dowel-receiving sockets 36 which are located to accommodate a pair of dowels 37 projecting outwardly from the interior face 12. The plug-like segment 16 is retained within the socket 33 and the dowels 37 are retained within the dowel sockets 36 through a suitable wood glue of the type normally used in adhesively securing furniture elements. Moreover, it should be noted that since the shoulders 34 and the shoulders 18 are formed on matching oblique planes, the corner connection has an outer appearance of a mitered corner.

The rail 1 is provided on its interior face with a longitudinally extending groove 38 for snugly accommodating the tongue 39 of a support bar 40 which is, in turn, further reinforced by a plurality of longitudinally spaced wood screws 41. The rail 3 is similarly provided on its interior face with a longitudinally extending groove 42 for snugly accommodating the tongue 43 of a support bar 44. The support bar 44 is provided on its right transverse end with a groove 45 for snugly engaging a laterally projecting tongue 46 formed on the lateral end of the support bar 40. In like manner, the support bar 44 is provided with a laterally projecting tongue 47 which snugly fits in the longitudinally extending groove 38 when the rails 1, 3, are secured in the manner as shown in FIGS. 20 and 22. Inasmuch as the various rails 1, 2, 3, 4, are substantial duplicates of each other, it should be obvious that the rail 3 is attached to the rail 2, the rail 2 is attached to the rail 4, the rail 4 is attached to the rail 1, and the legs 6, 7, 8, are attached at the corners in the same manner, as above described.

Referring to FIG. 2, B designates a double base-frame which consists of a pair of transverse rails 48, 49, each of which has the same length as, and are substantial duplicates of, the rails 3, 4. The base-frame B is also provided with a pair of longitudinal rails 50, 51, which have a length equal to each other, and that length being equal to twice the length of one of the longitudinal rails 1, 2, in the base-frame A. However, the rails 50, 51, are substantially identical to the rails 1, 2, in all other respects. Moreover, each of the rails 48, 49, 50, 51, are provided with legs 52, 53, 54, 55, respectively.

A half base-frame C substantially as shown in FIG. 3 comprises a pair of transverse rails 56, 57, each of which has a length equal to and is a substantial duplicate of the rail 3. The base-frame C is also provided with a pair of longitudinal rails 58, 59, which have equal lengths, and that length being equal to one-half the length of either of the rails 1, 2, in the base-frame A. The rails 58, 59, are substantially identical to the rails 1, 2, in all other respects. Moreover, the connection between the various rails 56, 57, 58, and 59, is the same as the connection between the rails 1 and 3. The rails 56, 57, 58, and 59, are similarly provided with tubular legs 60, 61, 62 and 63, respectively.

It should be understood that the various rails 48, 49, 50, 51, and the rails 56, 57, 58, 59, are formed of the same wood used in the construction of the various rails 1, 2, 3, 4, and each is provided with the same exterior finish. It can be seen that the base-frame B is a modular multiple of the base-frame A being, in effect, twice the length thereof. Similarly, the base frame C is a submultiple of the base-frame A, being one-half the length thereof. Thus, the base-frames A, B, and C, are, of course, the same size in width and height so as to be dimensionally consistent within the modular system of the present invention.

The base-frames A, B, C, can be endwise connected by a pair of so-called connector-rails 64 which are formed of the same wood used in the construction of any of the aforementioned rails 1–4, and are of rectilinear shape. A single or unit-sized rail 64 includes an exterior face 65, an interior face 66, a top face 67, a bottom face 68, and a pair of transverse end faces 69, 70. The rail 64 is provided with a vertical recess 71 adjacent its left transverse end face 70 for accommodating a joint-plate 72 which somewhat resembles one element of a common butt-hinge. The joint-plate 72 is secured in the recess 71 by means of wood screws 73, substantially as shown in FIGS. 19 and 20. The recess 71 is sized so that the outer face of the joint-plate 72 is flush with the exterior face of the connecting rail 64. The joint-plate 72 has a greater height than the vertical dimension of the rail 64 and is provided with an integrally formed upstanding flange 74 for supporting a first pintle-receiving sleeve or knuckle 75, the latter having a lower margin coincident with the top face 67. Integrally formed with the joint-plate 72 in downwardly spaced relation and in vertical alignment with the sleeve 75 is a second pintle-receiving sleeve or knuckle 76. Referring to FIGS. 19 and 20, it can be seen that the connecting rail 64 can be attached to a common connection of the rails 1, 3, or any other corner connection of rails in any of the base-frames A, B, C.

The sleeve 75 is located so that it will engage the upper margins of the sleeve 21. Moreover, the sleeve 76 is located so that it can be inserted between the intermediate sleeve 22 and the lower sleeve 23 of the support rail 1. In this connection, it should be noted that the sleeve 76 is sized so that it can be snugly interposed between the sleeves 22, 23, without leaving any gap. Inasmuch as each of the sleeves 21, 22, 23, 75, 76, are in vertical registration, they will snugly accommodate a removable pin or pintle 77 having a relatively long shank 78 and an integrally formed enlarged head 79. Thus, in order to make a three-corner connection, it is possible to connect a connecting rail 64 to any one connection of any of the base-frames A, B, C, in the manner as shown in FIG. 20.

The opposite end of the connecting rail 64 is provided on its exterior face with a vertical recess 80 adjacent its right transverse end face 69 for accommodating a hinge-plate or so-called "hinge leaf" 81, which is secured by means of a pair of wood screws 81'. By reference to FIGS. 21 and 22, it can be seen that the recess 80 is sized so that the exterior face of the hinge plate 81 is flush with the exterior face 65 of the connecting rail 64. The hinge plate 81 has a greater height than the vertical dimension of the rail 64 and is provided with an integrally formed depending flange 82 for supporting a pintle-receiving sleeve or knuckle 83, the latter having its upper margin coincident with the bottom face 68 of the rail 64. Also integrally formed with the hinge plate in upwardly spaced relation and in vertical alignment with the sleeve 83 is a pintle-receiving sleeve or knuckle 84.

By reference to FIG. 21, it can be seen that the sleeves 83, 84, extend outwardly from the hinge plate 81 at an approximate 45° angle with respect to the exterior face 68. Moreover, it can be seen that the sleeve 83 is so located so that it will engage the lower margin of the lower sleeve 23. Moreover, the sleeve 84 is located so that it can be snugly interposed between the sleeves 21, 22, without leaving any gap, and the aligned sleeves 21, 22, 23, 83, and 84, will accommodate the removable pintle 77. Thus, it can be seen that any one of the support rails 64 can be connected to any one of the base-frames A, B, or C.

The support rail 64 is provided on its interior face with a lengthwise extending groove 85 which is parallel to the top face 67 and terminates at each of the transverse end faces 69, 70. A support bar 86 is secured to the interior face 66 of the connecting rail 64 through a plurality of longitudinally spaced wood screws 87. The support bar 86 integrally includes an inwardly extending tongue 88 for snugly fitting within the groove 85. Referring to FIGS. 23 and 24, it can be seen that the support bar 86 terminates a slight distance inwardly from each of the transverse end faces 69, 70, such distance at least being equal to the thickness of any of the rails 1, 2, 3, 4, 48, 49, 50, 51, and 56, 57, 58, 59.

A plurality of double-connecting rails or so-called "connector rails," 89 is also provided for endwise connecting any two of the base-frames A, B, C. The connecting rail 89 is substantially identical to the previously described connecting rail 64. Each of the connecting rails 89 has a length which is equal to the length of the rails 50, 51, this length being twice the length of the connecting rail 64. A plurality of connecting rails 90 each having a length one and one-half times the length of the connecting rails 64 is also provided for endwise connecting any of the base-frames A, B, C. The connecting rails 90 are substantially identical in all other respects to the previously described connecting rails 64. A plurality of connecting rails 91, each having a length substantially equal to the length of the longitudinal rails 58, 59, is provided for endwise connecting any of the base-frames A, B, C. The connecting rails 91 each have a length which is one-half the length of any of the connecting rails 64.

A plurality of spacer blocks 92, substantially as shown in FIGS. 11 and 16, is provided for endwise connecting any two of the base-frames A, B, C. Each of the spacer blocks 92, is substantially identical to the previously described connecting rails 64 except that the blocks 92 are not provided with the support bar 86. The spacer blocks 92 have a relatively short length when compared to the length of any of the support rails 64, 89, 90, or 91, so that they merely serve as an interconnecting means rather than as an element intended to occupy a length of floor space. However, the spacer blocks 92 are particularly functional if it is desired to obtain a slight margin of length.

Referring to FIGS. 24 and 25, it can be seen that a pair of connecting rails similar to the rails 64 can be connected to any corner of any of the base-frames A, B, C, in order to obtain the so-called "four-corner connection." This connection is particularly useful when it is necessary to follow a right-angle bend or corner in a wall-arrangement, such as is illustrated in FIG. 47. It can thus be seen that the corner base-frame has a common point for connecting two connecting rails of the type described. When making a "four-corner connection" the sleeve 76 is interposed between the sleeves 22, 23, and the sleeve 84 is interposed between the sleeves 21, 22. Moreover, the sleeve 75 engages the upper margin of the sleeve 21 and the sleeve 85 engages the lower margin of the sleeve 23. Inasmuch as all of the aforementioned sleeves 21, 22, 23, 75, 76, 83, 84, are vertically registered, they will snugly accommodate the removable pintle 77, in order to form the four-corner connection shown in FIG. 24.

It can be seen that when two connecting rails, such as the rails 64, are used to endwise connect any of the base-frames A, B, C, the rear connecting rail is always reversed in direction with respect to the front connecting rail 64, so that the joint-plates 72, 81, are on opposite ends and are relatively so arranged that, when connected, the upper and lower horizontal edges will be respectively co-planar. The support bars 40, 44, and 86, are provided with longitudinally spaced apertures 93 in order to accommodate suitable fasteners in a manner to be hereinafter described.

Provided for attachment to any of the aforementioned base-frames A, B, C, are thirteen separate furniture pieces including the single furniture top 94, a double furniture top 95, a half furniture top 96, a left L-shaped furniture top 97, a right L-shaped furniture top 98, a filler top 99, a table top 100, a half table top 101, a planter box 102, a half planter box 103, a chair 104, a seat-cushion 105, and a planter box insert 106.

The single furniture top 94 is preferably formed of the same wood used in the construction of the rails 64 and bars 40, 44, and is square in horizontal cross-section having four identical side faces 107 and a flat bottom face 108. Glued or otherwise rigidly secured to the bottom face 108 are four depending mounting blocks 109, which are located in approximate relation to the corners of the furniture top 94 and each includes vertical bores 110, which align with the apertures 93 on the various support rails for accommodating suitable fasteners (not shown), in order to secure to top 94 to the various rails.

The double furniture top 95 is also preferably formed of the same wood used in the construction of the rails 1–4, is rectangular in horizontal cross-section, and includes a pair of identical transverse side faces 111, 112, which are of equal length and each being equal to the length of any side face 107. The top 95 includes a pair of longitudinal faces 113, 114, each of which is twice the length of any side face 107, and a flat bottom face 115. Rigidly secured to the bottom face 115 by means of wood screws 116 in approximate relation to the four corners thereof are four depending mounting blocks 117, each of which is provided with vertical bores 118, which register with the apertures 93 in any of support rails or connecting rails for securement thereto. Referring to FIGS. 47 and 48, it can be seen that the double furniture top 115 is conveniently employed as a "coffee table" top. Thus, wood screws 119 can be inserted in the apertures 93 and into the bores 118 in the manner as shown in FIG. 46.

The half furniture top 96 is similarly formed of the same wood used in the construction of the rails 1–4, is rectangular in horizontal cross-section, and includes a pair of identical transverse side faces 120, 121, which are equal to the length of the side faces 111, 112, and a pair of longitudinal faces 123, 124, which are one-half the length of the side faces 107. The half furniture top 96 is also provided with a bottom face 125 and glued or otherwise rigidly secured thereto in proximate relation to each of the four corners are depending mounting blocks 126, each of which is provided with vertical bores 127. The bores 127 will vertically register with the apertures 93 in the various rails for accommodating suitable fasteners (not shown) in order to secure the half furniture top 96 to any of the base frames 1, 2, 3. It can thus be seen that each of the tops 94, 95, 96, are secured to any of the base-frames A, B, C, in the manner that the top 95 is secured to the frame B.

The furniture top 97 is L-shaped in horizontal cross-section and has a rectangular portion 128 with an integrally formed outwardly extending arm 129 along one margin thereof and which is formed with the same type of wood employed in the construction of the rails 1–4. Glued or otherwise rigidly secured to the underside of the rectangular portion are four depending mounting blocks 130 located in proximate relation to the four corners of the rectangular portion 128 and each being provided with vertical bores 131. Similarly mounted near the other end of the arm 129 is a mounting block 132 having a vertical bore 133. When secured to any of the base frames A, B, C, the bores 131, 133, will vertically register with the apertures 93 in any of the various aforementioned rails for accommodating suitable fasteners (not shown) in order to secure the furniture top 129 to any of the aforementioned base frames A, B, C.

The right L-shaped furniture top 98 is, in effect, a mirror image of the furniture top 97 and includes a rectangular portion 134 and an integrally formed outwardly extending arm 135 along one margin thereof. Mounted on the underside of the rectangular portion 134 in proximate relation to each of the four corners are four depending mounting blocks 136, each being provided with a vertical bore 137. Similarly mounted near the outer end of the arm 135 adjacent one of its longitudinal margins is a mounting block 138 having a vertical bore 139. Thus, when the top 98 is secured to any of the various aforementioned rails, the bores 117, 119, will correctly register with the apertures 93 in order to accommodate suitable fasteners (not shown).

The filler top 99 is similarly formed of the same type of wood employed in the construction of the rails 1–4 and is rectangular in horizontal cross-section. The filler top 99 is provided with a pair of depending mounting blocks 140 along its under-surface adjacent one of its longitudinal margins. Each of the blocks is provided with vertical bores 141, which are located to register with the apertures 93 on the various aforementioned rails, in order to accommodate suitable fasteners (not shown), so that the filler top 99 may be secured to any of the base frames A, B, C. Thus, by reference to FIGS. 47, 48, it can be seen that the left and right tops 97, 98, are usually employed in conjunction with the chairs 104 and serve as a type of insert in order to fill the gaps along the transverse side of each panel of chairs, such as shown in FIGS. 47 and 48. In this manner, the arms 125, 145, are sized to extend along the rearward margin of the chair 104. Also employed as a filler insert is the filler top 99. Each of these aforementioned components are secured to the frames A, B, C, by suitable fasteners (not shown).

The table top 100 is preferably formed of the same wood employed in the construction of the rails 1–4, and includes a relatively horizontal top 142 which is square in horizontal cross-section. Secured to the underside of the top 142 along its peripheral margin is a pair of lengthwise extending side walls 143, and a pair of transverse side walls 144. Secured to the interior face of the lengthwise extending walls 143 and extending between each of the transverse walls 144 are bottom plates 146, 146', which are relatively narrow in transverse dimension. Glued or otherwise rigidly secured to the underside of the plates 146, 146', is a pair of lengthwise extending depending mounting blocks 147, which are provided with bores 148, the latter of which are aligned with the apertures 93 on the various aforementioned rails for accommodating suitable fasteners (not shown). Each of the bottom plates 146, 146', are provided with a pair of leg-receiving sockets 149, 150, respectively, for carrying the upper ends of any of the aforementioned legs. It can thus be seen that the table top 100 is used as a coffee table or the like and is sized for securement to the base frame. Unlike the furniture top 94, the table top 100 will extend above the upper margin of the base frame A, whereas the table top 94 will have its upper surface flush with the upper margin of the frame A. Moreover, the furniture top 94 can also be used as a type of "filler" rather than as a table top.

The half table top 101 is similar in construction to the table top 100 and includes a top member 151 which is provided along its longitudinal margins with depending longitudinal walls 152 each having a length which is substantially one-half the length of either of the walls 143. The top member 151 is also provided with a pair of transverse side walls 153 which are substantially identical, and each have a length equal to the length of either of the transverse side walls 144. Thus, it can be seen that the half table top 107 is sized to be used with the base-frame C. Secured to the longitudinal walls 152 and extending between the transverse walls 153 is a pair of bottom plates 154, 155, which are provided with longitudinally extending depending mounting blocks 156, 157, respectively. The mounting blocks 156, 157, are provided at their transverse ends with vertical bores 158, 159, which will align with the apertures 93 for fastening to the table top 101 to the base-frame C. While the cross-sectional view of the table top 101 is not shown, it should be understood that the cross-sectional view of the table top 101 is substantially identical to the cross-sectional view of the table top 100 as shown in FIG. 37. The bottom plates 154, 155, are provided with pairs of square apertures 160, 161, at their outer ends in order to accommodate the upper ends of the various aforementioned legs when the top 101 is secured to the base-frame C.

The planter box 102 is similarly formed of the same type of wood employed in the construction of the rails 104, and consists of a top member 162 which is square in horizontal cross-section and has side margins, the lengths of which are equal to the lengths of the respective sides of the base-frame A. Secured to the underside of the top 162 on its longitudinal margains are longitudinal margins of longitudinal walls 163 and secured to the underside of the top 162 are transverse side walls 164. Secured to the lower margin of each of the longitudinal walls 163 and extending between the transverse walls 164 is a pair of bottom plates 165, 166. The planter box 102 is further reinforced by a pair of cross bars 167, 168, in the manner as shown in FIG. 35. Secured to the undersurface of the bottom plates 165, 166, adjacent their inner margins are depending mounting blocks 169, 170, each of which is provided with vertical bores 171, 172, respectively, at their outer ends and which align with the apertures 93. Thus, when the planter box 102 is secured to the base-frame A, the mounting blocks 169, 170, will rest upon the support bars 40, 44, and the bores 171, 172, will correctly align with the apertures 93 for accommodating suitable conventional fasteners (not shown). The base plate 165, 166, are provided with apertures 173, 174, at their outer ends in order to accommodate the upper ends of the various aforementioned legs. The top member 163 is also provided with a pair of relatively large square apertures 175 at diagonally opposite corners, substantially as shown in FIG. 35.

The half planter box 103 is similar in construction to the planter box 102 and is likewise formed of the same type of wood employed in the construction of the rails 1–4. The half planter box 103 consists of a top member 176, the longitudinal margins of which are substantially equal in length to the length of the rails 58, 59. The transverse margins of the top member 176, are substantially equal in length to the length of the rails 56, 57, so that the planter box 103, in effect, is sized to be mounted in the base-frame C. Secured to the underside of the top member 176 is a pair of longitudinal walls 177 and a pair of transverse walls 178. Secured to the lower margins of the longitudinal walls 177 and extending between the transverse side walls 178 is a pair of base plates 179, 180, having a relatively short transverse dimension and mounted on the underside of the base plates 179, 180, is a pair of depending mounting blocks 181, 182, each being provided with vertical bores 183, 184, at their outer ends. Thus, when it is desired to secure the planter box 103 to a base-frame such as the base-frame C, the mounting blocks 181, 182 will rest upon the support bars 40, 44, 86, and the bores 183, 184, will be vertically aligned with the apertures 93 in order to accommodate the suitable fasteners (not shown). The base plates 179, 180, are provided with square apertures 186, 187, which are located to accommodate the upper ends of the various aforementioned legs when the planter box 103 is secured to the base-frame C. The top member 176 is reinforced by a cross bar 188, substantially as shown in FIG. 36. The top member 176 is also provided with a relatively large square aperture 189 which is also sized to accommodate the planter box insert 106.

The planter box insert 106 is sized to be inserted in the various square apertures 175, 189, and is provided with an annular lip 190 along its upper margin, which engages the upper surface of the top member 162 and the upper member of the top surface 176 when used in the planter boxes 102, 103, respectively.

The seat-cushion 105 is square in horizontal cross-section and includes a rectangular base-frame 191 formed by four annular frame members 192. Secured to the frame members 192 is a base plate 193 and disposed upon the upper surface of the base plate 193 and being snugly fitted within a recess 194 formed within the frame 191 is a plywood backing 195. Adhesively secured to the upper surface of the plywood backing 195 and the base-frame 191 is a rubber foam layer 196 and adhesively secured to the upper surface of the rubber foam layer 196 is an outer leather seat cover 197 having a waffle-like pattern as shown in FIG. 39. In this connection, it should be noted that a layer of canvas could be substituted for the plywood backing 193. The side walls of the cushion 105 are provided with leather surface strip 198 which have inwardly struck flaps 199 at their lower ends for securement to the underside of the frame 191 and which are provided with welts 200 at their upper ends. Secured to the underside of the frame members 192 are four depending mounting blocks 201 which are sized to rest upon the support bars 40, 44, 86, and are provided with vertical bores 204 which register with the apertures 93 in order to accommodate suitable fasteners (not shown).

The chair 104 consists of a wooden base-frame 205 which is formed by four peripheral frame supports 206 and which are connected by tongue and groove type construction. Along their inner peripheral margins, the frame supports 206 are provided with a recess 207 for accommodating a base plate 208. A back frame 209 is also formed of four frame supports 210 which are provided with a recess 211 along their inner peripheral margins to accommodate a plywood backing 212. On its exterior surface, the frames 205, 109, are provided with a relatively thick layer of foam rubber 213 which is preferably adhesively secured to the plywood boards 202, 212, and adhesively secured to the exterior surface of the foam rubber layer 213 is a leather seat cover 214 preferably having a waffle-like pattern. The leather seat covers are conventionally seamed by means of welts 215 at their outer ends. By reference to FIGS. 42, 43, it can be seen that the seat 104 is inclined with respect to the horizontal when mounted on any of the aforementioned connecting members 64, 89, 90, 91. Secured to the annular wall of the chair frame 205 is a pair of side walls 216, which extend below the lower surface of the frame 205 and secured to the interior surface of the side walls 216 and the underside of the frame 205 is a pair of wedge-shaped members 217 having inclined bottom walls 218. Secured to the underside of the members 217 is a pair of depending mounting blocks 219 having inclined top walls 220 which match the inclined walls of the blocks 219 and are secured thereto by means of wood screws 221. The mounting blocks 219 have a flat bottom 222 and are provided with vertical bores 223. A rear support block 224 is provided with a pair of bores 225 for accommodating two bolts 226 in order to secure the rail 224 to one of the frame members 210 in the manner as shown in FIGS. 43, 44. The lower frame member 210 is provided with a pair of sockets 227 in order to accommodate nuts and washers 228. The block 224 is further provided with a pair of longitudinally spaced slots 229, 230, for reasons which will presently more fully appear.

Finally, the support block 224 is provided with a pair of vertical bores 231 at its outer ends. Thus, when it is desired to secure the chair 104 to any of the aforementioned base frames A, B, C, or connecting members 64, 89, 90, 91, the mounting block 219 is disposed upon any of the forward support bars 40, 44, 86, and the undersurface 222 engages the upper surface of the bars 40, 44, 68. Similarly, the support block 224 will engage the upper surface of one of the support bars 40, 44, 86.

In ordinary use, the modular components A are usually supplied to the retailer or distributor in disconnected form. In other words, each of the various components are packed in separate containers and can be unpacked and used as desired. Thus, when it is desired to arrange the furniture in various combinations to accommodate a particular type of floor plan, the retailer, distributor, or interior decorator will employ various of the base-frames A, B, C, and the connecting members 64, 89, 91, and spacer blocks 92. Thus, in order to obtain the floor plan of FIG. 48, which is only one combination of an almost infinite number of possible floor plans, the various combinations of the base-frames A, B, C, and the connecting members 64, 89–91, were employed.

It can be seen that the furniture tops are multiples of any of the base-frames A, B, C, and the connecting members 64, 89, 90, 91, and the spacer block 92 and any combinations thereof. For example, the furniture top 94, the table top 100, and the planter box 102 can be used with the base-frame A, or can be supported by the connecting members 64. When it is desired to construct an element such as the coffee table in FIG. 48, the base-frame B is employed and the furniture top 95 is secured thereto. The mounting blocks 117 are supported on the support bars 40 and the bores 118 will align with the apertures 93 for accommodating suitable fasteners (not shown). The furniture top 95 will provide sufficient rigidity to the frame C.

However, in connection with the connecting members 64, 89, 90, 91, and the spacer blocks 92, it is often necessary to employ a pair of metal reinforcing struts 233, 234, substantially as shown in FIG. 47. The struts 233, 234, are centrally provided with an enlarged portion 235 for securement to each other through a set of rivets 236. Moreover, the support struts 233, 234, are provided with apertures 237, 238, respectively, at their outer ends which align with the aperture 93 in the support bars 40, 44, 86. Thus, the support struts 233, 234, are used on each of the connecting members to provide a rigid construction, in the manner as shown in FIG. 47.

The furniture tops 94, 95, 96, the table tops 100, 101, and planter boxes 102, 103, are all secured to any of the aforementioned base-frames A, B, C, and connecting members 64, 89, 90, 91, in the manner as previously described. The chairs 104 and the seat-cushion 105 are also secured to the base-frames A, B, C, and connecting members 64, 89, 90, 91, in the manner as previously described. However, when the chairs 104 are used, the left and right furniture tops 97, 98, are preferably used as filler tops, that is to say, the spaces which are not covered by the chairs 94 are filled with the tops 97, 98, in the manner as shown in FIG. 48. In this connection, it should be noted that the rearward outwardly extending arms 119, 125, extend longitudinally behind the rearward margins of the chairs. Moreover, for a various number of chairs, filler tops 99 may be employed also in the manner as shown in FIG. 47.

It can thus be seen that the margin of furniture components are interrelated as to size and shape and, therefore, many different lay-outs can be created in a so-called "custom-built" appearance. In the completed form, the furniture of the present invention appears to have been built for a particular wall space or floor arrangement.

It should be understood that changes and modifications in the form, construction, arrangement, and combination of the several parts of the modular furniture and components thereof may be made and substituted for those herein shown and described without departing from the nature and principle of my invention.

Having thus described my invention, what I claim and desire to secure by Letters Patent:

1. Modular furniture comprising a plurality of base-frames, each of said base-frames having a front end, a rear end, and opposably presented sides, all of said base-frames having a common front-to-rear dimension so that when at least two of said base-frames are arranged in lateral relation the front ends of each will be contiguous to a common straight line, said base-frames having a transverse dimension which is the product of a first selected unit dimension multiplied by an integer, a plurality of first and second frame-forming members, interlocking means at one transverse end of each of said first frame-forming members, complementary interlocking means at the other transverse end, the interlocking means of one first frame-forming member being adapted for attachment to the complementary interlocking means of another first frame-forming member, a plurality of first sleeve-like elements secured to said one transverse end of each of said first frame-forming members and extending outwardly therefrom, a plurality of second matching sleeve-like elements secured to a transverse end of said second frame-forming members and being located for alignment with the sleeve-like elements on said first frame-forming members, a plurality of third sleeve-like elements secured to the opposite transverse end of said second frame-forming members and being located for alignment with said first and second sleeve-like elements, a pin-like element provided for insertion into the aligned sleeve-like elements for attaching a pair of said second frame-forming members to one of said first frame-forming members, said base-frames being formed by attaching the plurality of first and second frame-forming members, a plurality of support rails for endwise connecting said base-frames, and at least one upper furniture element attached to said base-frames.

2. Modular furniture comprising a plurality of base-frames, each of said base-frames having a front end, a rear end, and opposably presented sides, all of said base-frames having a common front-to-rear dimension so that when at least two of said base-frames are arranged in lateral relation the front ends of each will be contiguous to a common straight line, said base-frames having a transverse dimension which is the product of a first selected unit dimension multiplied by an integer, a plurality of first and second frame-forming members, interlocking means at one transverse end of said first frame-forming members, complementary interlocking means at the other transverse end, the interlocking means of one first frame-forming member being adapted for attachment to the complementary interlocking means of another first frame-forming member, a first joint plate having a plurality of first sleeve-like elements, said first joint plate being secured to said one transverse end of said first frame-forming member and extending outwardly therefrom at approximately a forty-five degree angle with respect to the exterior face thereof, a second joint plate having a plurality of second matching sleeve-like elements, said second joint plate being secured to a transverse end of said second frame-forming members at approximately a forty-five degree angle with respect to the exterior face thereof and being located for alignment with the sleeve-like elements on said first frame-forming members, a plurality of third sleeve-like elements secured to the opposite transverse end of said second frame-forming member and being located for alignment with said first and second sleeve-like elements, a pin-like element provided for insertion into the aligned sleeve-like elements for attaching a pair of second frame-forming members to one of said first frame-forming members, so as to completely cover the first and second joint plates, a leg element having a corner secured to said first sleeve-like elements, said base-frames being formed by attaching the plurality of first and second frame-forming members, a plurality of support rails for endwise connecting said base-frames, and at least one upper furniture element attached to said base-frames.

3. Modular furniture comprising in combination a plurality of base-frames, each of said base-frames having a front end, a rear end, and opposably presented sides, all of said base-frames having a common front-to-rear dimension so that when at least two of said base-frames are arranged in lateral relation the front ends of each will be contiguous to a common straight line, said base-frames having a transverse dimension which is the product of a first selected unit dimension multiplied by an integer, said base-frames being formed by attaching a plurality of base-frame forming members, a plurality of support rails for endwise connecting said base-frames, and at least one upper furniture element attached to said base-frames and support rails, said furniture elements being a modular multiple of the smallest of said base-frame forming members and the smallest of said base-frame connecting members.

4. Modular furniture comprising in combination a plurality of base-frames, each of said base-frames having a front end, a rear end, and opposably presented sides, all of said base-frames having a common front-to-rear dimension so that when at least two of said base-frames are arranged in lateral relation the front ends of each will be contiguous to a common straight line, said base-frames having a transverse dimension which is the product of a first selected unit dimension multiplied by an integer, frame forming members having a connecting element at each transverse end, a plurality of support rails having connecting elements at each transverse end, said support rails having a transverse dimension which is the product of a second selected unit dimension multiplied by an integer, each of said base-frames being formed by attaching the connecting element of one frame forming member to the connecting element of another frame forming member, each of said base-frames being endwise connected by attaching the connecting elements of a support rail to two opposed base-frames, and at least one upper furniture element attached to said base-frames.

5. Modular furniture comprising in combination a plurality of base-frames, each of said base-frames having a front end, a rear end, and opposably presented sides, all of said base-frames having a common front-to-rear dimension so that when at least two of said base-frames are arranged in lateral relation the front ends of each will be contiguous to a common straight line, said base-frames having a transverse dimension which is the product of a first selected unit dimension multiplied by an integer, frame forming members having a connecting element at each transverse end, a plurality of support rails having connecting elements at each transverse end, each of said base-frames being formed by attaching the connecting element of one frame forming member to the connecting element of another frame forming member, each of said base-frames being endwise connected by attaching the connecting elements of a support rail to the common connection of two frame forming members on each of two opposed base-frames, and at least one upper furniture element attached to said base-frames.

6. Modular furniture comprising a plurality of base-frames, each of said base-frames having a front end, a rear end, and opposably presented sides, all of said base-frames having a common front-to-rear dimension so that when at least two of said base-frames are arranged in lateral relation the front ends of each will be contiguous to a common straight line, said base-frames having a transverse dimension which is the product of a first selected unit dimension multiplied by an integer, a plurality of frame forming members, each having first and second connecting elements, a plurality of support rails, each of said support rails having third and fourth connecting elements, said frame forming members and support rails being attached to form the plurality of endwise adjoined base-frames, the two support rails in any connected base-frames always being parallel and having third and fourth connecting elements on opposite ends with respect to each other, and at least one upper furniture element attached to said base-frames.

7. Modular furniture comprising a plurality of base-frames, each of said base-frames having a front end, a rear end, and opposably presented sides, all of said base-frames having a common front-to-rear dimension so that when at least two of said base-frames are arranged in lateral relation the front ends of each will be contiguous to a common straight line, said base-frames having a transverse dimension which is equal to a selected unit dimension, a plurality of frame forming members, each having first and second connecting elements, a plurality of support rails, each of said support rails having third and fourth connecting elements, said frame forming members and support rails being attached to form the plurality of endwise adjoined base-frames, said third connecting element always being mutually perpendicular to said first connecting element and coplanar with respect to said second connecting element when a support rail is attached to a frame forming member, said fourth connecting element always being coplanar to said first connecting element and perpendicular to said second connecting element when a support rail is attached to a frame forming member, and at least one upper furniture element attached to said base-frames.

8. Modular furniture comprising a plurality of base-frames, each of said base-frames having a front end, a rear end, and opposably presented sides, all of said base-frames having a common front-to-rear dimension so that when at least two of said base-frames are arranged in lateral relation the front ends of each will be contiguous to a common straight line, said base-frames having a transverse dimension which is the product of a first selected unit dimension multiplied by an integer, a first frame forming member having a first connecting element secured to one end of said first frame forming member, a connecting element secured to the other end of said first frame forming member, a second frame forming member, third and fourth connecting elements secured to opposite ends of said second frame forming member, a leg rigidly secured to said first connecting element, said first and second frame forming members being attached to form the plurality of base-frames, a plurality of support rails for endwise connecting said base-frames, and at least one upper furniture element attached to said base-frames and support rails.

9. Modular furniture comprising a plurality of base-frames, each of said base-frames having a front end, a rear end, and opposably presented sides, all of said base-frames having a common front-to-rear dimension so that when at least two of said base-frames are arranged in lateral relation the front ends of each will be contiguous to a common straight line, said base-frames having a transverse dimension which is the product of a first selected unit dimension multiplied by an integer, a first frame forming member having a first connecting element secured to one end of said first frame forming member, a connecting element secured to the other end of said first frame forming member, a second frame forming member, third and fourth connecting elements secured to opposite ends of said second frame forming member, a leg rigidly secured to said first connecting element, a leg secured to the transverse end of frame forming members having the first interlocking means, said first and second frame forming members being attached to form the plurality of base-frames, a plurality of support rails for endwise connecting said base-frames, and at least one upper furniture element attached to said base-frames and support rails.

10. Modular furniture comprising a plurality of base-frames, each of said base-frames having a front end, a rear end, and opposably presented sides, all of said base-frames having a common front-to-rear dimension so that when at least two of said base-frames are arranged in lateral relation the front ends of each will be contiguous to a common straight line, said base-frames having a transverse dimension which is the product of a first selected unit dimension multiplied by an integer, a plurality of first frame forming members having first, second, third, and fourth interlocking means on one transverse end of said first frame forming members, first, second, third, and fourth complementary interlocking means on the opposite transverse ends of said first frame forming members, the first, second, third, and fourth interlocking means of the plurality of first frame forming members being attached to the first, second, third, and fourth complementary interlocking means respectively of a plurality of second frame forming members to form the plurality of base-frames, a plurality of support rails for endwise connecting said base-frames, and at least one upper furniture element attached to said base-frames and support rails.

References Cited by the Examiner

UNITED STATES PATENTS

| | | | |
|---|---|---|---|
| 2,620,220 | 12/1952 | Gresham | 297—24 |
| 2,829,707 | 4/1958 | Liebson | 297—440 |
| 2,866,676 | 12/1958 | Goebel | 312—108 |
| 2,930,665 | 3/1960 | Budai | 108—64 |
| 2,979,122 | 4/1961 | Knoll | 297—445 |
| 3,004,814 | 10/1961 | Schulze | 312—111 |
| 3,040,848 | 6/1962 | Powell et al. | 312—257 |
| 3,082,034 | 3/1963 | Silver | 297—135 |
| 3,093,410 | 6/1963 | Wilson | 297—440 |
| 3,101,218 | 8/1963 | Baerman | 297—455 |

FRANK B. SHERRY, *Primary Examiner.*